(12) United States Patent
Bergstrom

(10) Patent No.: US 11,326,625 B2
(45) Date of Patent: May 10, 2022

(54) BRINE DISPERSAL SYSTEM

(71) Applicant: Natural Ocean Well Co., Culver City, CA (US)

(72) Inventor: Robert A. Bergstrom, Culver City, CA (US)

(73) Assignee: NATURAL OCEAN WELL CO., Culver City, CA (US)

( * ) Notice: Subject to any disclaimer, the term of this patent is extended or adjusted under 35 U.S.C. 154(b) by 240 days.

(21) Appl. No.: 16/484,363

(22) PCT Filed: Feb. 9, 2018

(86) PCT No.: PCT/US2018/017618
§ 371 (c)(1),
(2) Date: Aug. 7, 2019

(87) PCT Pub. No.: WO2018/148542
PCT Pub. Date: Aug. 16, 2018

(65) Prior Publication Data
US 2020/0031691 A1 Jan. 30, 2020

Related U.S. Application Data

(60) Provisional application No. 62/457,034, filed on Feb. 9, 2017.

(51) Int. Cl.
*B01D 65/08* (2006.01)
*F04F 1/08* (2006.01)
(Continued)

(52) U.S. Cl.
CPC .............. *F04F 1/08* (2013.01); *B01D 61/025* (2013.01); *B01D 61/08* (2013.01); *B01D 61/10* (2013.01);
(Continued)

(58) Field of Classification Search
CPC .. F04F 1/08; F04F 1/20; B01D 61/025; B01D 61/08; B01D 61/10; B01D 65/02;
(Continued)

(56) References Cited

U.S. PATENT DOCUMENTS 1,825,631 A 9/1931 Horvath
2,864,506 A 12/1958 Hiskey
(Continued)

FOREIGN PATENT DOCUMENTS

CN 100572821 C 12/2009
CN 202860208 U 4/2013
(Continued)

OTHER PUBLICATIONS

U.S. Appl. No. 16/484,323, filed Aug. 7, 2019.
(Continued)

*Primary Examiner* — Waqaas Ali
(74) *Attorney, Agent, or Firm* — Patterson Thuente Pedersen, P.A.

(57) ABSTRACT

A desalination brine dispersal apparatus and method employ airlift to remove, oxygenate and disperse brine from a desalination apparatus. The apparatus includes a brine removal conduit having a brine inlet that receives brine from the desalination apparatus, a plurality of brine outlets submerged in seawater and one or more air introduction points located at depths below the brine outlets. The supplied air oxygenates and moves brine through the brine removal conduit and outlets via airlift and disperses the brine into seawater away from the brine removal conduit. The apparatus avoids the formation of concentrated, high shear brine plumes and can disperse brine into seawater over a wide area well away from the brine removal conduit.

18 Claims, 6 Drawing Sheets

(51) Int. Cl.
| | |
|---|---|
| *B01D 61/02* | (2006.01) |
| *B01D 61/08* | (2006.01) |
| *B01D 61/10* | (2006.01) |
| *B01D 65/02* | (2006.01) |
| *C02F 1/00* | (2006.01) |
| *C02F 1/44* | (2006.01) |
| *C02F 1/76* | (2006.01) |
| *C02F 1/78* | (2006.01) |
| *C02F 103/00* | (2006.01) |
| *C02F 103/08* | (2006.01) |
| *F04F 1/20* | (2006.01) |

(52) U.S. Cl.
CPC .......... *B01D 65/02* (2013.01); *B01D 65/08* (2013.01); *C02F 1/001* (2013.01); *C02F 1/441* (2013.01); *C02F 1/76* (2013.01); *C02F 1/78* (2013.01); *B01D 2311/04* (2013.01); *B01D 2311/08* (2013.01); *B01D 2311/20* (2013.01); *B01D 2311/2661* (2013.01); *B01D 2313/12* (2013.01); *B01D 2313/243* (2013.01); *B01D 2315/06* (2013.01); *B01D 2317/04* (2013.01); *B01D 2321/04* (2013.01); *C02F 2103/007* (2013.01); *C02F 2103/08* (2013.01); *C02F 2209/03* (2013.01); *C02F 2209/22* (2013.01); *C02F 2209/40* (2013.01); *C02F 2303/20* (2013.01); *F04F 1/20* (2013.01)

(58) Field of Classification Search
CPC ............. B01D 65/08; B01D 2311/04; B01D 2311/08; B01D 2311/20; B01D 2311/2661; B01D 2313/12; B01D 2313/243; B01D 2315/06; B01D 2317/04; B01D 2321/04; B01D 2313/24; C02F 1/001; C02F 1/441; C02F 1/76; C02F 1/78; C02F 2103/007; C02F 2103/08; C02F 2209/03; C02F 2209/22; C02F 2209/40; C02F 2303/20; Y02A 20/131
See application file for complete search history.

(56) References Cited

U.S. PATENT DOCUMENTS

| | | | |
|---|---|---|---|
| 2,987,472 A | 6/1961 | Kollsman | |
| 3,060,119 A | 10/1962 | Carpenter | |
| 3,133,132 A | 5/1964 | Loeb et al. | |
| 3,133,137 A | 5/1964 | Loeb et al. | |
| 3,156,645 A | 11/1964 | Chapin et al. | |
| 3,168,467 A | 2/1965 | Dreyer | |
| 3,171,808 A | 3/1965 | Todd | |
| 3,342,728 A | 9/1967 | Malm | |
| 3,355,382 A | 11/1967 | Huntington | |
| 3,367,504 A | 2/1968 | Westmoreland | |
| 3,417,870 A | 12/1968 | Bray | |
| 3,456,802 A | 7/1969 | Cole | |
| 3,969,834 A | 7/1976 | Geier et al. | |
| 4,040,486 A | 8/1977 | Kirkland, Jr. | |
| 4,125,463 A | 11/1978 | Chenoweth | |
| 4,135,364 A | 1/1979 | Busick | |
| 4,310,012 A | 1/1982 | Finley | |
| 4,334,992 A | 6/1982 | Von Bonin et al. | |
| 4,335,576 A | 6/1982 | Hopfe | |
| 4,352,736 A | 10/1982 | Ukai et al. | |
| 4,363,703 A | 12/1982 | ElDifrawi et al. | |
| 4,414,114 A | 11/1983 | Drude et al. | |
| 4,455,232 A | 6/1984 | Reid | |
| 4,512,886 A | 4/1985 | Hicks et al. | |
| 4,595,460 A | 6/1986 | Hurt | |
| 4,666,377 A | 5/1987 | Brown | |
| 4,770,775 A | 9/1988 | Lopez | |
| 4,808,287 A | 2/1989 | Hark | |
| 5,192,434 A | 3/1993 | Moller | |
| 5,229,005 A | 7/1993 | Fok et al. | |
| 5,366,635 A | 11/1994 | Watkins | |
| 5,620,605 A | 4/1997 | Moller | |
| 5,651,894 A | 7/1997 | Boyce et al. | |
| 5,788,858 A | 8/1998 | Acernese et al. | |
| 5,914,041 A | 6/1999 | Chancellor | |
| 5,944,999 A | 8/1999 | Chancellor et al. | |
| 5,972,216 A | 10/1999 | Acernese et al. | |
| 5,980,751 A | 11/1999 | Chancellor | |
| 6,074,551 A | 6/2000 | Jones et al. | |
| 6,149,393 A | 11/2000 | Chancellor | |
| 6,187,202 B1 | 2/2001 | Fish | |
| 6,348,148 B1 | 2/2002 | Bosley | |
| 6,540,487 B2 | 4/2003 | Polizos et al. | |
| 6,656,352 B2 | 12/2003 | Bosley | |
| 6,800,201 B2 | 10/2004 | Bosley | |
| 7,052,582 B2 | 5/2006 | Madkour | |
| 7,713,032 B2 | 5/2010 | Davis, Sr. | |
| 7,731,847 B2 | 6/2010 | Ton That | |
| 8,282,823 B2 | 10/2012 | Acernese et al. | |
| 8,282,836 B2 | 10/2012 | Feher | |
| 8,685,252 B2 | 4/2014 | Vuong et al. | |
| 9,227,159 B2 | 1/2016 | Dufresne et al. | |
| 9,861,937 B2 | 1/2018 | Benton et al. | |
| 9,964,113 B2 | 5/2018 | Westberg et al. | |
| 10,060,296 B2 | 8/2018 | Friesth | |
| 10,151,318 B2 | 12/2018 | Westberg et al. | |
| 2005/0184008 A1 | 8/2005 | Schacht | |
| 2005/0218074 A1 | 10/2005 | Pollock | |
| 2006/0065597 A1 | 3/2006 | Kunczynski | |
| 2008/0025852 A1 | 1/2008 | Davis | |
| 2008/0156731 A1 | 7/2008 | Gordon | |
| 2008/0190849 A1 | 8/2008 | Vuong | |
| 2010/0116726 A1* | 5/2010 | Dwek | B63J 4/004 210/170.11 |
| 2010/0270236 A1 | 10/2010 | Scialdone | |
| 2010/0276369 A1 | 11/2010 | Haag | |
| 2011/0048921 A1 | 3/2011 | Cap et al. | |
| 2011/0277842 A1* | 11/2011 | Blumenthal | E02B 1/003 137/1 |
| 2011/0297595 A1 | 12/2011 | Wallace | |
| 2014/0076807 A1 | 3/2014 | Chidambaran | |
| 2014/0105765 A1 | 4/2014 | Tonnessen | |
| 2016/0257576 A1 | 9/2016 | Hoz | |
| 2017/0028356 A1 | 2/2017 | Motherway et al. | |
| 2017/0306966 A1 | 10/2017 | Valland et al. | |

FOREIGN PATENT DOCUMENTS

| | | |
|---|---|---|
| EP | 2 302 201 A2 | 3/2011 |
| GB | 2 068 774 A | 8/1981 |
| JP | H 07-317508 A | 12/1995 |
| JP | 2016-150273 A | 8/2016 |
| RU | 2417333 | 8/2010 |
| WO | WO 00/41971 | 7/2000 |
| WO | WO 2005/006942 A1 | 1/2006 |
| WO | WO 2009/086587 A1 | 7/2009 |

OTHER PUBLICATIONS

Smith, S., API Gas Lift Design Course, Workshop Clegg & Smith, 200 pages (2007).
Water Quality Control Plan, Ocean Waters of California, California Water Boards, 103 pages(2015).
Codeline® 80E Series, Pentair, 1 page (2015).
Dashtpour Reza, et al., Energy Efficient Reverse Osmosis Desalination Process, International Journal of Environmental Science and Development, vol. 3, No. 4 7 pages (Aug. 2012).
Dow Filmtec™ SW30HR-380 Element, Product Data Sheet, DOW®, 3 pages (Nov. 2015).
François et al., A physically based model for air-lift pumping, Water Resources Research, vol. 32, No. 8, pp. 2383-2399 (Aug. 1996).
SeaPRO* Series 50 Hz, Fact Sheet, GE Power & Water, Water & Process Technologies, 3 pages (Jul. 2013).
Hanafizadeh, P. and Ghorbani B., Review study on airlift pumping systems, Multiphase Science and Technology, 24 (4): pp. 323-362 (2012).

(56) References Cited

OTHER PUBLICATIONS

Nenes, A. et al., Simulation of Airlift Pumps for Deep Water Wells, The Canadian Journal of Chemical Engineering, vol. 74, pp. 448-456 (Aug. 1996).

Nenes, A. et al., Simulation of Airlift Pumps for Moderate-Depth Water Wells, Published in Technika Chronika, 14, 1-20, 45 pages (1996).

Pacenti, P. et al., Submarine seawater reverse osmosis desalination system, Desalination, 126, pp. 213-218 (1999).

Riglin, Jacob D., Performance Characteristics of Airlift Pumps with Vortex Induced by Tangential Fluid Injection, Bucknell University, Bucknell Digital Commons, 65 pages (2011).

Pougatch, K. et al., Numerical modeling of deep sea air-life, Ocean Engineering, 35, pp. 1173-1182 (2008).

Usage Guidelines for Dow Filmtec™ 8" Elements, Tech Fact, DOW®, 1 page (Aug. 2015).

Water Desalination Report, The international weekly for desalination and advanced water treatment since 1965, vol. 54, No. 44, 3 pages (Nov. 26, 2018).

Real Results, Xtra-Lift™ Gas-Lift System Significantly Improves Production, Allows Operator to Produce Wells to Depletion, Weatherford® International Ltd., 1 page (2007).

Gas-Lift Equipment Catalog, Weatherford® International plc, 104 pages (2014).

Zukoski, E.E., Influence of viscosity, surface tension, and inclination angle on motion of long bubbles in closed tubes, J. Fluid Mech., vol. 25, part 4, pp. 821-837 (1966).

I. Alameddine and M. El-Fadel, "Brine discharge from desalination plants: a modeling approach to an optimized outfall design,", Desalination 214 (2007) 241-260, 20 pages.

Lorin R. Davis, Fundamentals of Environmental Discharge Modelling (1999).

Bobylev Andrej Olegovich, RU2417333, Patent Translate Machine generated translation, 7 pages, 2011.

\* cited by examiner

BRINE DISPERSAL SYSTEM

CROSS REFERENCE TO RELATED APPLICATION APPLICATIONS

This application is a national stage filing under 35 U.S.C. § 371 of International Application No. PCT/US2018/017618 filed Feb. 9, 2018, and entitled "BRINE DISPERSAL SYSTEM", which claims priority to U.S. Provisional Application No. 62/457,034 filed Feb. 9, 2017, entitled "SUBMERGED REVERSE OSMOSIS SYSTEM", the disclosures of which are both incorporated herein by reference in their entirety.

TECHNICAL FIELD

This invention relates to water desalination.

BACKGROUND ART

The growth of saltwater (e.g., seawater) desalination has been limited by a number of factors, Such systems typically employ an onshore facility containing a distillation or evaporation apparatus or separation membranes (e.g., reverse osmosis or "RO" membranes) supplied with seawater from a submerged offshore intake system, and producing a concentrated brine stream that is returned to the sea. Both the intake seawater and the concentrated brine stream have high corrosion potential and consequently require expensive components and equipment. Onshore desalination facilities typically also require significant amounts of expensive seaside real estate. Saltwater desalination has in addition been criticized for various environmental impacts, including entrainment of marine life in the intake water, greenhouse gas production associated with producing the energy required, potential harm to marine life caused by the discharged brine, and the use of treatment chemicals that may enter the ocean.

In the 50 years since the invention of semi-permeable RO membranes, various concepts for submerging such membranes and employing natural hydrostatic water pressure to help desalinate seawater been proposed. Representative examples include the systems shown in U.S. Pat. Nos. 3,456,802 (Cole), 4,125,463 (Chenowith), 5,229,005 (Fok et al.), 5,366,635 (Watkins), 5,914,041 (Chancellor '041), 5,944,999 (Chancellor '999), 5,980,751 (Chancellor '751) and 6,348,148 Bi (Mosley), US Patent Application Publication Nos. 2008/0190849 A1 (Vuong) and 2010/0270236 A1 (Scialdone), GB Patent No. 2 068 774 A (Mesple) and International Application No WO00/41971 A1 (Gu). An experimental system is described in Pacenti et al., *Submarine seawater reverse osmosis desalination system*, Desalination 126, pp. 213-18 (November, 1999). It appears however that submerged RU systems (SRO systems) have not been placed in widespread use, due in part to factors such as the energy cost of pumping the desalinated water to the surface from great depth and the difficulty of maintaining mechanical moving parts at depth.

For both conventional (viz., onshore, offshore platform-mounted or ship-borne) desalination systems and submerged desalination systems, the brine discharge stream remains an environmental concern. California recently adopted an amendment (the "Desalination Amendment") to its Water Quality Control Plan for the Ocean Waters of California to address effects associated with the construction and operation of saltwater desalination facilities. Included in the Desalination Amendment are requirements concerning brine discharge. In an effort to meet these requirements, many desalination facilities have been exploring the use of multiport diffusers (viz., spaced ports or nozzles installed on submerged marine outfalls) and the use of ever-higher pressures to inject brine into the surrounding seawater. However, doing so creates high-shear brine plumes that can harm marine life.

From the foregoing, it will be appreciated that what remains needed in the art is an improved desalination brine dispersal system featuring one or more of lower energy cost, lower capital cost, lower operating cost or reduced environmental impact. Such systems are disclosed and claimed herein.

SUMMARY OF THE INVENTION

This invention provides in one aspect a wide-area desalination brine dispersal system comprising a brine removal conduit having
  a) a brine inlet that receives brine from a desalination apparatus;
  b) a plurality of brine outlets submerged in seawater; and
  c) one or more air introduction points located at depths below the brine outlets, for oxygenating and moving brine through the brine removal conduit and outlets via airlift and dispersing the brine into seawater away from the brine removal conduit.

The invention provides in another aspect a method for dispersing desalination brine from a desalination apparatus over a wide area, the method comprising supplying brine and air to a brine removal conduit having a brine inlet in fluid communication with the desalination apparatus, a plurality of brine outlets submerged in seawater and one or more air introduction points located at depths below the brine outlets; wherein the supplied air oxygenates and moves brine through the brine removal conduit and outlets via airlift and disperses the brine into seawater away from the brine removal conduit.

BRIEF DESCRIPTION OF THE DRAWING

Like reference symbols in the various figures of the drawing indicate like elements. The elements in the drawing are not to scale.

DETAILED DESCRIPTION

Figure 1A:
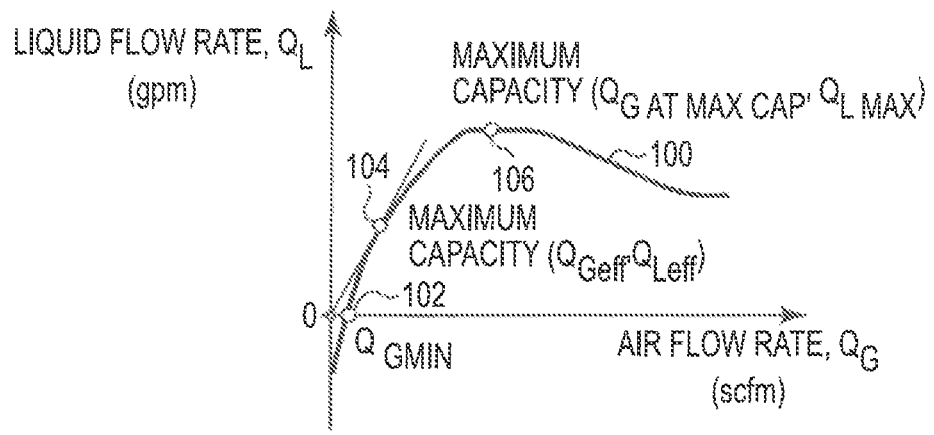
FIG. 1a and FIG. 1b are graphs illustrating efficiency, capacity and recommended operating conditions for pumping liquids using an airlift pump.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, apparatus that contains "a" conduit includes "one or more" such conduits.

The term "air fraction" when used with respect to a two-phase air:liquid (e.g., air:water) flow through a conduit refers to the volumetric fraction, expressed as a percentage, of the air volume over the length of the conduit compared to the conduit volume, with the conduit length and volume referring to the total length and total volume unless otherwise specified. Expressed somewhat differently, the air fraction for such a two-phase flow refers to the air volume as a percent of the total volume of air plus liquid in the conduit.

The term "airflow rate" when used with respect to an airlift pump supplied by an air compressor refers to the volumetric airflow measured at the compressor outlet. There are many possible ways to define compressor operating conditions and specifications (e.g., based on outlet pressure, flow and temperature). Airflow rates at any given set of conditions and specifications can be converted, using well known relationships, to airflow rates at other conditions and specifications. If not otherwise specified herein, airflow rates are measured in cubic feet per minute at 1 atmosphere (14.73 psi, 1 bar or 100,000 Pascals) and 5-10° F. (41-50° C.). The resulting rates will be numerically somewhat lower than standard cubic feet per minute (slam) rates determined at 70° F. (21° C.), but will be used in recognition of the typical temperatures that may be encountered at the expected brine dispersal depths.

The term "airlift" when used with respect to a pump refers to a device or method for pumping a liquid or slurry by injecting air (and preferably only by injecting air) into the liquid or slurry.

The term "annular flow" when used with respect to a two-phase flow regime in a conduit refers to a regime in which liquid (e.g., water or brine) flows primarily as a film along the conduit wall and gas (e.g., air) flows primarily as a separate phase in the center of the conduit. The gas phase may contain entrained droplets of liquid, in which case the flow regime may be referred to as "annular flow with droplets" but can still be regarded as an annular flow regime.

The term "brine" refers to an aqueous solution containing more sodium chloride than that found in typical saltwater, viz., more than about 3.5% sodium chloride.

The term "bubble flow" when used with respect to a two-phase flow regime in a conduit refers to a regime in which gas (e.g., air) primarily flows as small bubbles within a continuous liquid water or brine) phase flowing through the conduit. The bubbles may be very small, in which case the flow regime may be referred to as "dispersed bubble flow" or "finely dispersed bubble flow" but may still he regarded as a bubble flow regime.

The term "churn flow" when used with respect to a two-phase flow regime in a conduit refers to a regime between slug flow and annular flow in which large bubbles of gas (e.g., air), typically having a diameter near the diameter of the conduit and a length ranging up to several times the diameter, flow through the conduit in a chaotic and disordered flow pattern along with liquid that may contain numerous small bubbles.

The term "conduit" refers to a pipe or other hollow structure (e.g., a bore, channel, duct, hose, line, opening, passage, riser, tube or wellbore) through which a liquid flows during operation of an apparatus employing such conduit. A conduit may be but need not he linear, and may for example have other shapes including branched, coiled or radiating outwardly from a central hub.

The term "depth" when used with respect to an airlift pump (or to a component of a submerged apparatus) refers to the vertical distance, viz., to the height of a water column, from the free surface of a body of water in which the pump or component is submerged to the point of pump air introduction or to the location of the component.

The terms "desalinated water" and "fresh water" refer to water containing less than 0.5 parts per thousand (ppt) dissolved inorganic salts by weight. Exemplary such salts include sodium chloride, magnesium sulfate, potassium nitrate, and sodium bicarbonate.

The terms "efficiency" and "efficiency ratio" when used with respect to an airlift pump intended to pump liquids refer to the ratio of the water mass flow rate to the air mass flow rate. When the context indicates, efficiency may refer to the ratio of output pumping power to the required input power.

The terms "flow regime" or "flow pattern" when used with respect to two-phase flow from an airlift pump refer to the type and appearance of bubbles or other airflow along a specified length of the lift conduit. It will be appreciated that at constant airflow rates the flow regime will vary within any vertical conduit by depth, with the flow regime typically having fewer or smaller air bubbles at the bottom of the conduit, and at sufficiently high airflow ratios having more or larger bubbles or even an annular column of air as the depth and the associated hydrostatic pressure in the conduit at that depth both decrease.

The term "lift height" when used with respect to an airlift pump refers to the vertical distance from the water surface to the point of discharge. For an airlift pump that discharges above the water surface, the lift height will be positive. For an airlift pump that discharges below the water surface, the lift height will be negative.

The term "maximum capacity" when used with respect to an airlift pinup at a given submergence ratio refers to the maximum liquid discharge flow rate attainable with a given system configuration using air as the injection gas.

The term "maximum efficiency" when used with respect to an airlift pump at a given submergence ratio refers to the efficiency ratio for a given system configuration at which increased energy input provides a diminishing increase in liquid flow rate plotted on the y-axis in a two-dimensional Cartesian coordinate system (viz., the ordinate) per unit of additional airflow rate plotted on the x-axis (viz., the abscissa). This corresponds to an asymptote for such plot beyond which the slope (viz., the ratio of liquid flow rate to airflow rate) diminishes.

The terms "saltwater" and "seawater" refer to water containing more than 0.5 ppt dissolved inorganic salts by weight. In oceans, dissolved inorganic salts typically are measured based on Total Dissolved Solids (TDS), and typically average about 35,000 parts per million (ppm) TDS, though local conditions may result in higher or lower levels of salinity.

The term "slug flow" when used with respect to a two-phase flow regime in a conduit refers to a regime in which gas (e.g., air) primarily flows through the conduit as large bubbles, typically having a diameter at or near the diameter of the conduit and a length ranging from the diameter to several times the diameter, along with a liquid that may contain numerous small additional bubbles.

The term "submerged" means underwater.

The term "submergence" when used with respect to a submerged airlift pump refers to the vertical distance from the water surface to the (or an) air introduction point.

The term "submergence ratio" when used with respect to an airlift pump refers to the ratio of submergence to lift height.

The term "submersible" mean suitable for use and primarily used while submerged.

The term "superficial velocity" when used with respect to the flow of a fluid in a conduit refers to the volumetric flow rate Q (expressed for example in $m^3/s$) divided by the conduit cross-sectional area A (expressed for example in $m^2$). When used with respect to a two-phase flow regime (for example, an air:water flow regime), this definition can be applied to either phase and calculated to provide a hypothetical flow velocity for a particular phase as if such phase was the only phase flowing or present in a given cross-sectional area.

The term "two-phase" when used with respect to flowing substances refers to the simultaneous flow of such substances in two different phases, typically as a gas and a liquid.

The term "water flow rate" when used with respect to an airlift pump that pumps water refers to the volumetric airflow at the outlet from the pump discharge conduit.

The term "wide area" when used with respect to dispersal of a fluid (e.g., brine) away from a conduit having a plurality of fluid outlets (e.g., brine outlets) distributed along a length of the conduit, means dispersal into an area, and typically into a volume, encompassing at least 5 meters of such length. The disclosed area or volume will also have other dimensions (e.g., a width, diameter or height) that will depend in part upon the direction and velocities of fluid streams passing through the fluid outlets. Because such other dimensions will be affected by variable factors including fluid flow rates inside and outside the conduit, and the overall shape of the dispersed fluid plume, the term "wide area" has been defined by focusing merely on the recited length along the recited conduit, as such length typically will represent a fixed quantity in a given dispersal system.

Airlift pumping systems may be used for a variety of pumping tasks, including not only the pumping of water but also in undersea mining operations such as dredging the sea floor to recover gold nuggets or manganese nodules. "Gas lift" is a term commonly used in oil and gas production, including offshore and onshore applications, to raise desired gaseous or oily products to the surface. Airlift and gas lift systems can also transport solids, e.g., the above-mentioned nuggets and nodules, sand, gold and the like. However, the disclosed brine dispersal system will typically involve only the transport of a liquid (viz., brine) using a gas (viz., air).

Airlift and gas lift systems normally are operated using air or gas and liquid flow rates selected to maximize the amount of desired product obtained per unit of pumping energy expended. For a two-phase system that transports air or another gaseous phase and a desired liquid product phase, maximum pumping efficiency typically arises when the average flow within the conduit carrying the desired liquid product to the surface represents a so-called "slug" or "churn" flow regime as discussed in more detail below. Further details regarding airlift pump flow regimes may be found for example in Francois et al., *A physically based model for airlift pumping*, Water Resources Research, 32, 8, pp. 2383-2399 (1996), Nenes et al., *Simulation of Airlift Pumps for Deep Water Wells*, Can. J. Chem. Eng, 74, 448-456 (August 1996) and Pougatch et al., *Numerical modeling of deep sea air-lift*, Ocean Engineering, 35, 1173-1182 (2008).

Figure 1B:
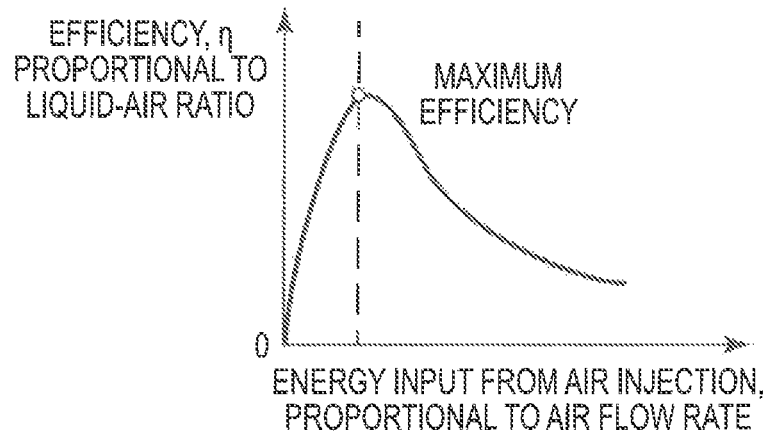

FIG. 1a shows a plot 100 of liquid flow rate $Q_L$ versus air flow rate $Q_G$ for a vertical airlift system. At a given lift height, there is a minimum air flow value 102 (designated in FIG. 2a as "$Q_{Gmin}$") that is required to maintain the initial flow of liquid at a steady state rate. As the air flow rate $Q_G$ and consequently the volume of air in the discharge water conduit are increased above $Q_{Gmin}$, the flow of liquid from the discharge water conduit and efficiency both initially increase. At an asymptote represented by point 104, the airlift pump efficiency, which corresponds to the slope $Q_G/Q_G$, readies a maximum value designated as "$Q_{Geff}$, $Q_{Leff}$", and thereafter declines as the air flow rate increases further. FIG. 1b illustrates the pump efficiency η as a function of the energy input from air introduction, and shows the change in slope for curve 200 with increasing air flow rate $Q_G$. The point of maximum efficiency and the point of maximum capacity occur at different air flow rate values. For airlifting brine, an airlift pump preferably is operated between the points of maximum efficiency and maximum capacity. However, operation in other flow regimes may be used if desired, for example to provide greater or lesser oxygenation of the flowing brine.

Figure 2:
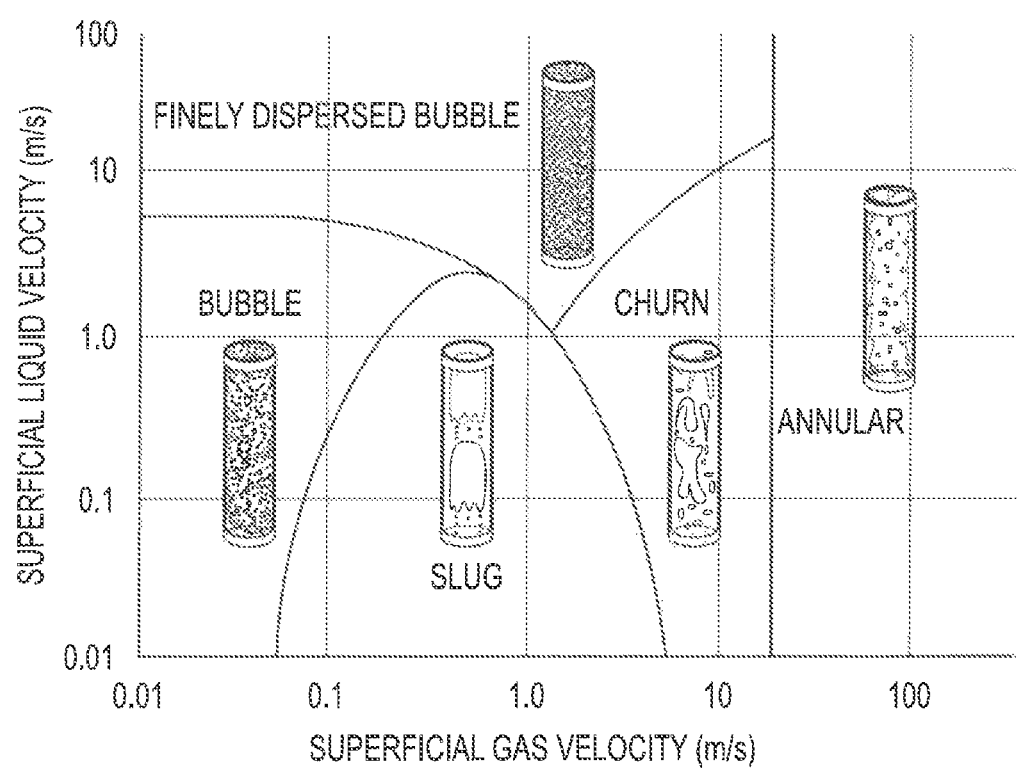
FIG. 2 depicts various flow regimes overlaid atop a graph of superficial liquid velocity vs. superficial gas velocity for a vertical airlift pump system operated over a range of air and liquid flow rates.

The brine removal conduit in the disclosed system may include a combination of vertical, horizontal or Oblique sections. The nature of the flow regimes that might arise is however most easily understood by primarily considering the limiting situations represented by vertical and horizontal discharge conduits. FIG. 2 depicts several potential vertical flow regimes overlaid atop a graph of superficial liquid velocity vs. superficial gas velocity for a vertical brine airlift pump system operated over a range of air and liquid flow rates. At small air flow rates and at liquid flow rates up to a superficial liquid velocity of about 5 m/s, the system operates in a bubble flow regime in which in which air flows as small bubbles dispersed in water. As the air flow rate increases, the bubbles coalesce to form large bubbles that drive a "slug" of liquid up the conduit in a slug flow regime. Further airflow rate increases cause the large bubbles to become unstable and form a churn flow regime. For a vertical conduit pumping liquids, the transition from maximum efficiency to maximum capacity (see FIG. 1a) occurs in the transition regime between slug flow and churn flow. At yet larger air flow rates, annular flow regimes arise.

Figure 3:
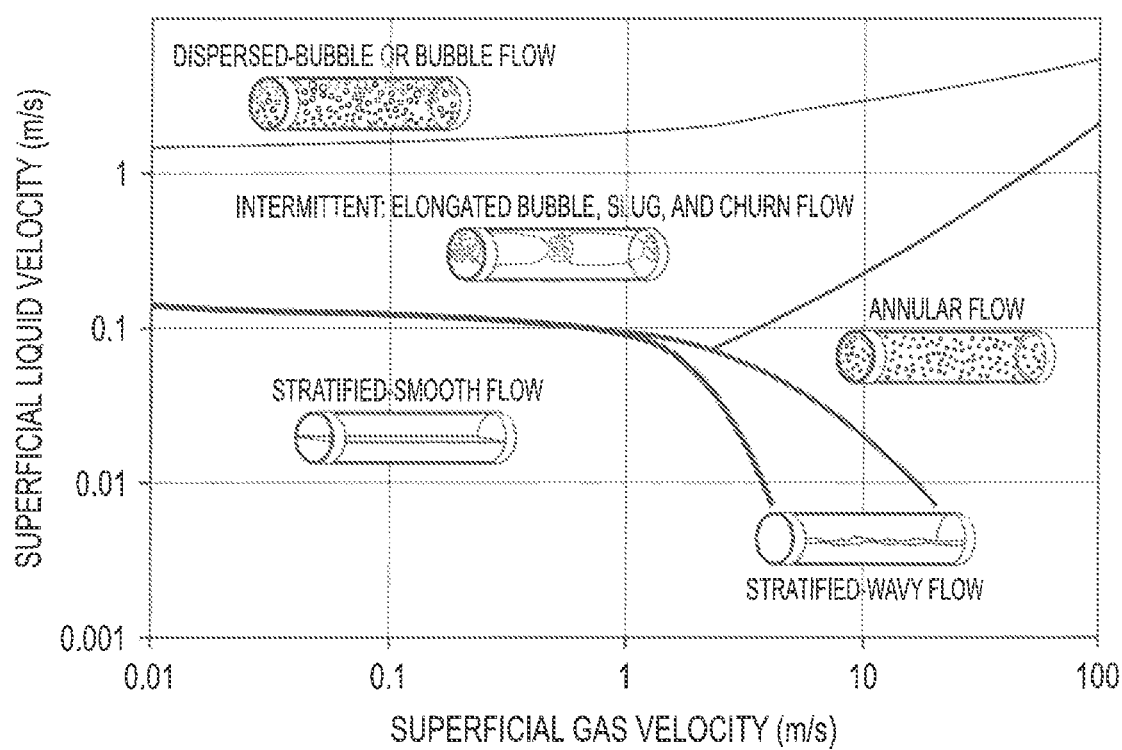
FIG. 3 depicts various flow regimes overlaid atop a graph of superficial liquid velocity vs. superficial gas velocity for a horizontal airlift pump system operated over a range of air and liquid flow rates.

FIG. 3 depicts several potential horizontal flow regimes overlaid atop a graph of superficial liquid velocity vs. superficial gas velocity for a horizontal brine airlift pump system operated over a range of air and liquid flow rates. At small air flow rates and at liquid flow rates up to a superficial liquid velocity of about 0.1 m/s, the system operates in a stratified-smooth flow regime. At somewhat higher air flow rates, a stratified-wavy flow regime arises. As the water flow rate increases above that required to maintain a stratified-smooth flow regime, a bubble flow regime eventually arises, with intermittent occurrence of elongated bubble, slug flow and chum flow regimes. At very high air flow rates and over a relatively wide range of liquid flow rates, an annular flow regime arises.

Air bubbles expand as the depth and hydrostatic pressure decrease. Thus for a vertical or oblique discharge conduit, the flow regime can vary along the brine removal conduit length, and may for example represent bubble flow at the maximum depth, slug flow or chum flow at intermediate depths and annular flow nearer the surface. In some instances it may be desirable to employ an annular flow regime over a substantial portion of the brine removal conduit length, for example to increase oxygenation, to help force brine through openings in the conduit, or to decrease the average weight of the water:air column and thereby reduce backpressure at the bottom of the brine removal conduit.

The disclosed brine dispersal system may used with any conduit that transports brine from a desalination apparatus to or into a body of water (e.g., to or into a nearby river, lake, sea or ocean) in which the brine is to be dispersed. Such conduits may carry brine from a variety of desalination apparatus sources and a variety of desalination processes, including brine produced by onshore distillation or evaporation facilities, brine produced by onshore RO facilities, brine produced by SRO systems, brine produced at offshore platform-mounted or seaborne (e.g., ship-borne) desalination systems, brine in marine outfalls, brine in sub-seabed tunnels, and other brine sources and conduits that will. be familiar to persons having ordinary skill in the art. The disclosed air supply inserts (e.g., bleeds, pumps, injects or otherwise provides) air into the brine removal conduit at one or more points located at or downstream from (viz., distal with respect to) the lowest point in the brine path. The disclosed brine outlets may be upstream or downstream from the first air introduction point, but desirably are downstream (and more preferably at least 1, at least 2, at least 5 or at least 10 meters downstream) from such point. In the interest of overall airlift and dispersal efficiency, the disclosed brine outlets preferably also are at lesser depths (viz., closer to the surface) than such air introduction point(s). The term "downstream" consequently may refer to a point having higher elevation than that of an air introduction point.

Figure 4:
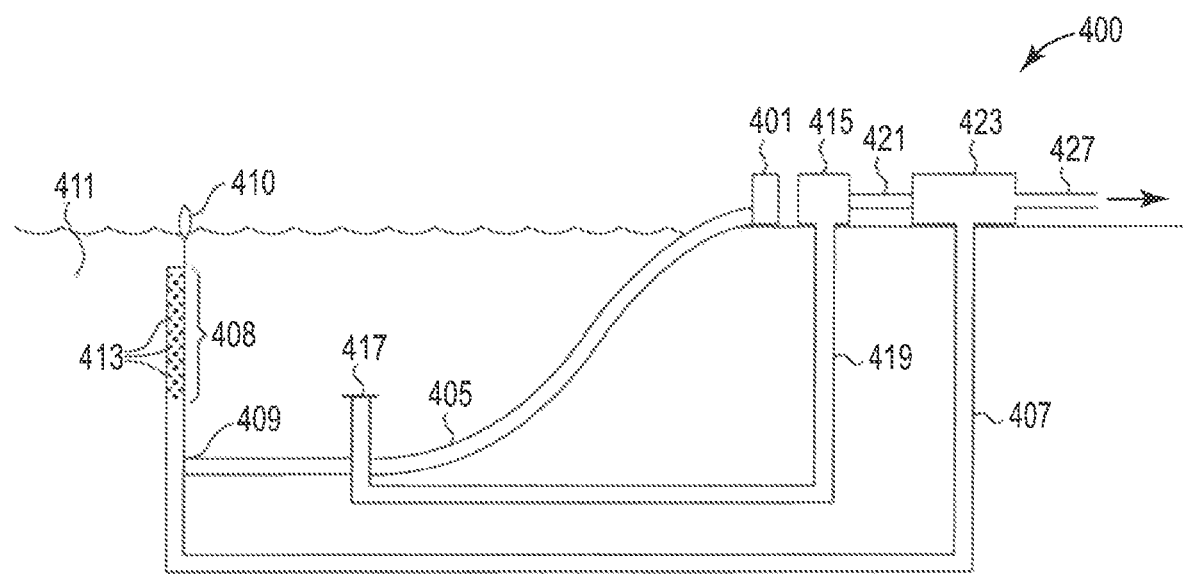
FIG. 4 is a schematic side view of an onshore RO desalination facility using the disclosed brine dispersal system.

FIG. 4 is a schematic side view of one embodiment of an onshore RO facility 400 that uses the disclosed brine dispersal system. Compressor 401 delivers compressed air to high pressure air line 405. Airline 405 supplies airlift air to brine removal conduit 407 at air introduction point 409. The distal end of brine removal conduit 407 is supported by buoy 410, which also serves to mark the approximate location of the distal end of conduit 407. Brine within conduit 407 is dispersed into the surrounding seawater 411 through brine outlets 413 arrayed along the length of brine dispersal section 408, which is positioned downstream (viz., above) air introduction point 409.

Pretreatment facility 415 processes seawater drawn in through intake 417 and seawater supply conduit 419, and employs filtration elements, settling tanks or other measures (not shown in FIG. 4) to remove organic contaminants and other solids from the supplied seawater. Filtrant from facility 415 passes through conduit 421 into reverse osmosis facility 423 where pressure applied to the filtrant forces it into RO membranes to separate the filtrant into fresh water and brine. Brine is sent to sea water 411 via brine removal conduit 407, and freshwater is delivered to a water processing facility (not shown in FIG. 4) via conduit 427 for further treatment such as chlorination, fluoridation or remineralization, and thence to one or more water customers such as a municipal or rural water system, water reservoir, hotel, resort, agricultural facility or other entity in need of fresh water.

Figure 5:
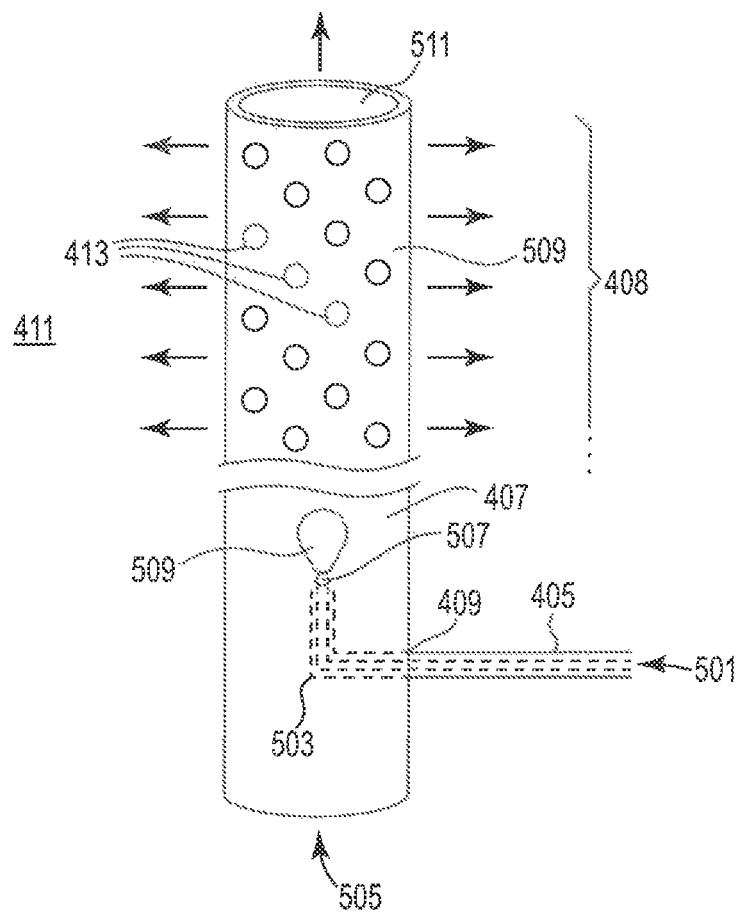
FIG. 5 is a side perspective view of a portion of the FIG. 4 brine removal conduit.

FIG. 5 is a perspective view, partially in phantom, of airline 405, conduit 407 and a portion of brine dispersal section 408. Compressed air travels within passage 501 past elbow 503 and enters the flowing brine stream 505 at nozzle 507. Bubbles such as bubble 509 carry the flowing brine stream upwards within brine removal conduit 407 towards brine dispersal section 408. Brine exits conduit 407 through brine outlets 413 whereupon it mixes with surrounding seawater 411. Any remaining brine exits conduit 407 at open end 511 and mixes with seawater 411.

Figure 6:
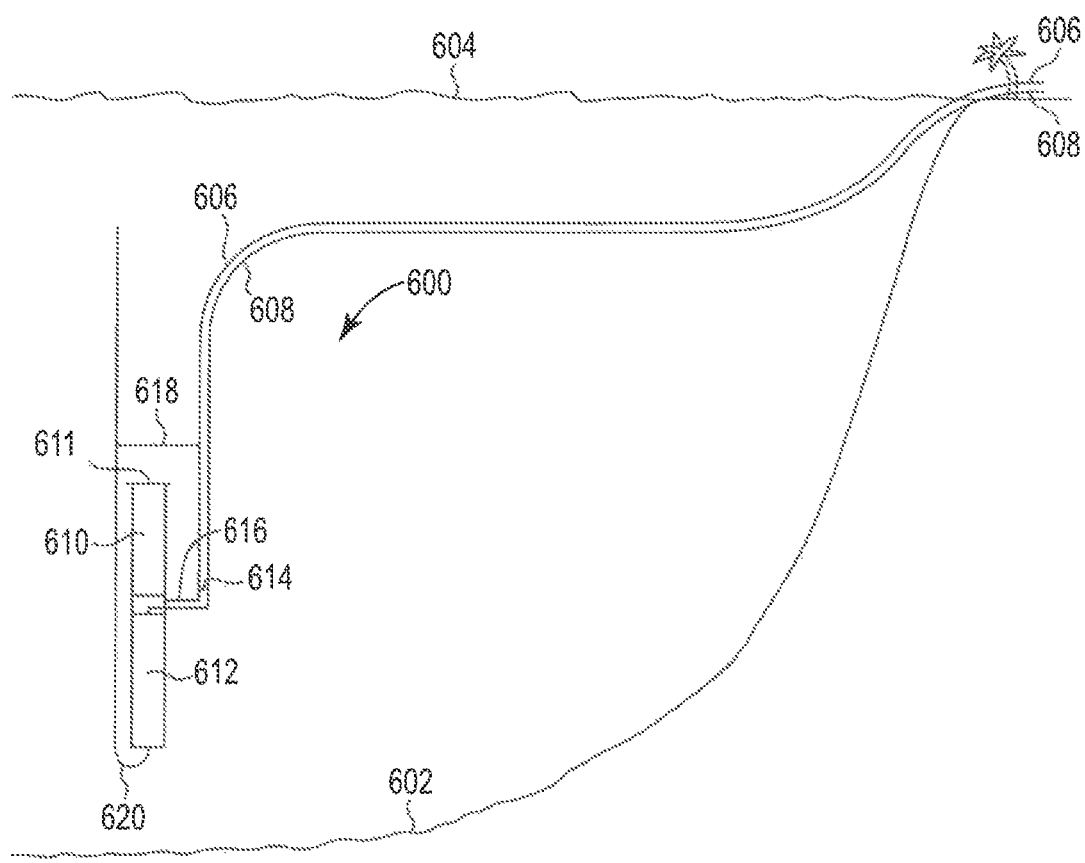
FIG. 6 and FIG. 7 are schematic sectional views of an SRO desalination system using the disclosed brine dispersal system.

FIG. 6 is a schematic view of one embodiment of an SRO desalination system that uses the disclosed brine dispersal system. Further details regarding such system are provided in Applicant's copending International Application No. (Attorney Docket No. 4624.01WO01), filed even date herewith and entitled SUBMERGED REVERSE OSMOSIS SYSTEM, the disclosure of which is incorporated herein by reference. System 600 is submerged in saltwater at an appropriate depth between seafloor 602 and sea surface 604. System 600 may if desired rest upon or be anchored to seafloor 602. System 600 is supplied with compressed air via airline or airlines 606 connected to one or more onshore compressors (not shown in FIG. 6). Desalinated water product is removed from system 600 via product water delivery conduit 608. System 600 includes prefilter 610 for removal of gross seawater contaminants. Filter 610 may contain one or an array of any suitable filtration devices, for example membranes, nonwoven webs, woven webs, particles, hollow or solid fibers or other filtration structures. System 600 also includes reverse osmosis unit 612 containing one or an array of reverse osmosis membranes arranged in a preferred parallel configuration for separation of desalinated water and brine. In other embodiments, the membranes may be configured in series, or both in series and in parallel. Seawater enters system 600 via inlet screen 611 atop prefilter 610. Airlines 614, 616 and 618 extend from airline(s) 606 and may be controlled by on-shore valves, orifice plates or (as shown in FIG. 6), by individually actuated valves. Airline 614 supplies lift air to product water delivery conduit 608 for use in directing desalinated water product through delivery conduit 608 via airlift pumping. Airline 616 supplies purge air to backflush (and if desired, via a further suitable valved or otherwise controlled injection point, to flush) prefilter 610. The use of such purge air can remove or prevent the buildup of contaminants and overcome or avoid clogging, and may be carried out continuously or at any appropriate interval or sequence. Airline 618 supplies airlift to remove concentrated brine from reverse osmosis unit 612 via brine removal conduit 620, for dispersal at one or more locations remote from system 600, as discussed in more detail below.

Figure 7:
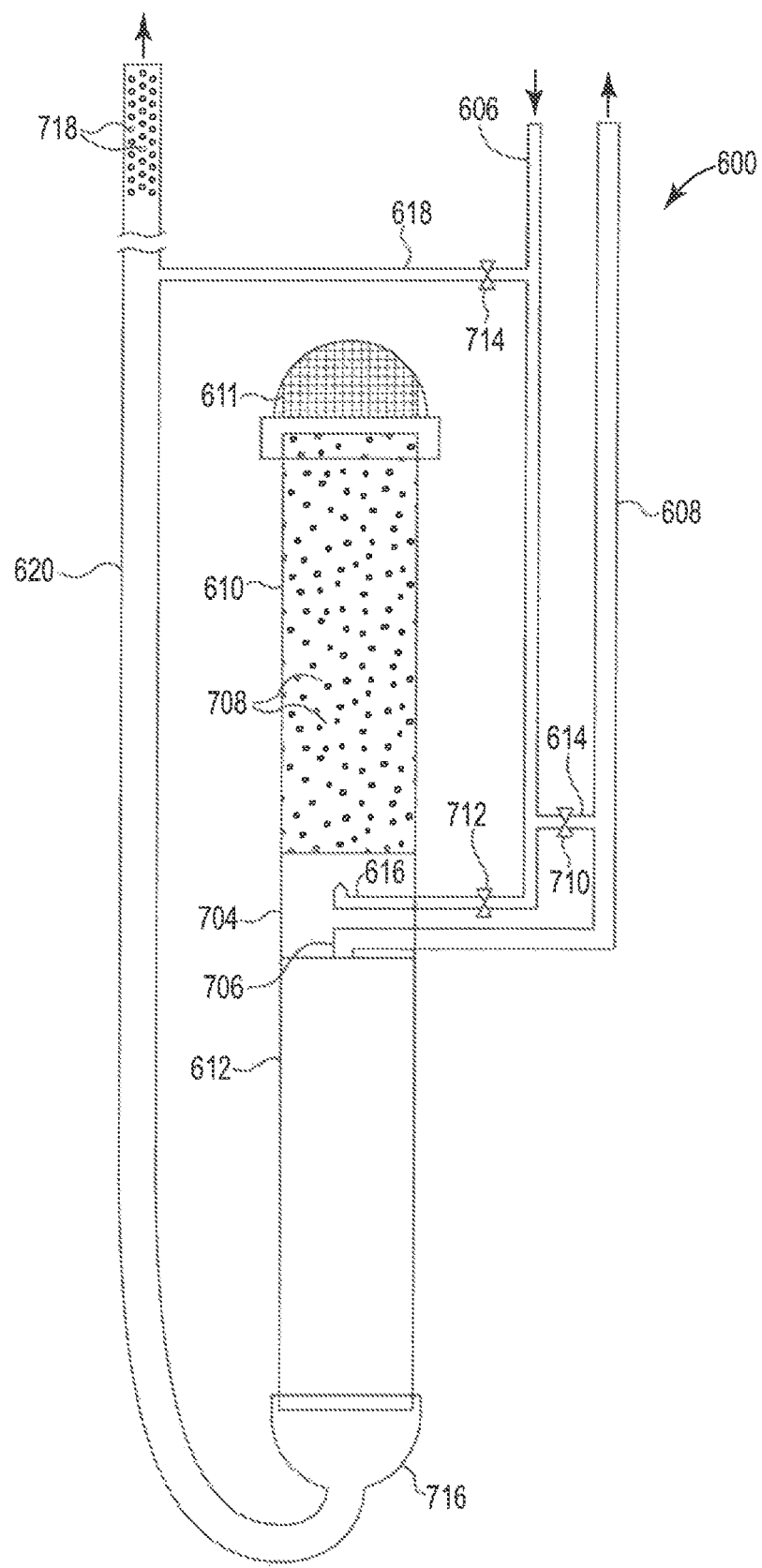

FIG. 7 shows system 600 in greater detail. Rough screen 602 blocks the entry of fish and other large objects into system 600. Coupling 704 joins prefilter 610 to reverse osmosis unit 612, and delivers filtered seawater to reverse osmosis unit 612. Air bubbles 708 may be supplied from time to time or continuously beneath prefilter 610 to carry out air purging as discussed above. Fresh product water exits reverse osmosis unit 612 via collector 706 and enters product water conduit 608, whereupon airlift (supplied from airline 606 via submerged valve 710 and airline 614) can be used to remove the product water. Manifold 716 collects brine from reverse osmosis unit 612 and directs it into brine removal conduit 620. Brine removal conduit 620 is provided with airlift using air supplied from airline 606 via submerged valve 714 and airline 618. Submerged valves 710, 712 and 714 can be used to regulate the flow of air through airlines 614, 616 and 618 into system 600, and may in the interest of simplicity and reduced maintenance be eliminated and replaced by onshore valves or other airflow control measures. Brine removal conduit 620 may if desired be combined with or serve as an anchor or tether for a buoy that indicates the SRO system location. Any desired flow regime may be used in brine removal conduit 620, for example a slug, churn or annular flow regime. A substantial portion of brine removal conduit 620 beyond (viz., above as shown in FIG. 6 and FIG. 7) airline 618 includes a plurality of perforations or other openings 718 in the sidewall of brine removal conduit 620. The openings 718 provide brine outlets through which brine can disperse into seawater away from brine removal conduit 620. Depending on the size, shape, extent and axial orientation of such openings and the flow of brine within brine removal conduit 620, seawater may be drawn into some of the openings 718 in brine removal conduit 620 and thereby provide brine dilution within brine removal conduit 620.

Although not shown in FIG. 6 and FIG. 7, persons having ordinary skill in the art will understand that system 600 may include an electrical supply and appropriate electronic controls to operate air valves or other submerged components, measure desired operating parameters (e.g., pressures, temperatures, flow rates and the like), and to handle other electrically-driven or electrically operated equipment or other signaling needs. Preferably however the use of submerged electrical components is minimized or eliminated. The disclosed submerged optional valves may for example be operated using air pressure provided via one or more additional air supply lines, or eliminated altogether by supplying air at appropriately varied pressures from the air compressor systems, optionally together with appropriate arrangement of the respective depths at which the disclosed airlines inject air into the prefilter, product water stream or brine stream.

The FIG. 6 and FIG. 7 SRO system preferably lacks submerged moving parts and especially wearing parts (e.g., pump impellers, shafts, valves and other components) that might by design or through the failure of a seal or enclosure come into contact with seawater or brine beyond their designed capability or suitability. In preferred embodiments, the disclosed SRO system operates entirely without such failure-prone submerged parts as pumps, motors and valves, is composed entirely of seawater-tolerant materials, and provides steady-state, continuous or essentially continuous RO desalination using the hydrostatic weight of the ocean above the membrane or membrane assembly to supply the pressure required to drive the pure water through the membrane while leaving most of its salts behind. Maintenance needs can accordingly be reduced by avoiding frictional sliding surfaces, pump cavitation, motor or bearing failure and other causes of wear or premature component failure. In one embodiment of the disclosed system, the brine airlift pressure can be set at the same pressure as the discharge airlift pressure by injecting air for the brine airlift at an appropriately higher elevation than for the discharge airlift. This allows the use of one air pressure line instead of two separate lines having different pressures, helps prevent the accidental injection of air into the RO membranes, and provides further simplification.

The disclosed brine dispersal system may be used to remove and airlift brine produced by a variety of types of onshore, offshore platform-mounted, seaborne (e.g., shipborne) or submerged desalination apparatus, and to disperse it into seawater into two and more preferably into three dimensions. In preferred embodiments the brine is dispersed into one or more substantial vertical portions of a water column or columns above or remote from the disclosed SRO apparatus. The recited dispersion can occur over a wide area or areas at one or more locations remote from the desalination apparatus, Doing so can avoid the localized discharge of concentrated brine dispersed by high-pressure point-source diffusers as commonly used to disperse RO brine today, and the possible harm to marine life from high salinity or diffuser shear forces. If desired, more than one air introduction (e.g., air injection) point may be employed, with higher introduction points typically requiring less energy to operate the associated brine airlift, and lower introduction points providing a greater conduit length along which oxygenation, dilution or dispersion may take place. The brine removal conduit preferably rises vertically or upwardly away from the air introduction point(s) and terminates at a lesser depth than the air introduction point(s) so as to facilitate airlift of brine within the brine removal conduit. The brine removal conduit preferably has a substantial length beyond the air introduction point, e.g., at least 5 meters, at least 10 meters, at least 20 meters, at least 30 meters, at least 50 meters or at least 100 meters. The brine removal conduit preferably rises vertically or upwardly away from the air introduction point(s) and terminates at a lesser depth than the air introduction point(s) so as to facilitate airlift of brine within the brine removal conduit. The brine removal conduit preferably has a substantial length beyond the air introduction point, e.g., at least 5 meters, at least 10 meters, at least 20 meters, at least 30 meters, at least 50 meters, at least 100 meters, at least 500 meters or at least 1,000 meters. If desired, the brine removal conduit may divide or subdivide into a plurality of preferably upwardly-directed arms each of which may carry airlifted brine and disperse it into the surrounding seawater.

The brine-dispersing portion of the brine removal conduit preferably contains a plurality of perforations or other openings in the conduit sidewall (or even one-way or other valves if desired) that provide brine outlets. The brine outlets may be located below and more preferably are located above the air introduction point(s). The outlets may disperse brine at a variety of depths, for example at depths above, below or both above and below a thermocline or halocline. The disclosed brine outlets are desirably sized, positioned and oriented to allow the dispersion of brine into the surrounding seawater and well away from the brine removal conduit. The brine outlets preferably are arranged over a substantial length along the conduit (and more preferably are arranged over a substantial vertical portion of a water column) of at least 5 meters, and in some embodiments, at least 10 meters, at least 20 meters, at least 30 meters, at least 50 meters, at least 100 meters, at least 500 meters or at least 1,000 meters. A variety of brine outlet opening shapes may be employed, including circular holes, slots, polygons, tapered ducts and other shapes. Vanes or other deflectors may be positioned within the brine removal conduit to add turbulence to or to direct the brine through brine outlets. Brine can also be expelled from the brine outlets due to the expansion of rising air within the brine removal conduit. If desired, some of the disclosed openings may be sized, oriented or positioned to allow diluting seawater to be drawn into the moving brine stream within the conduit, e.g., via the Venturi effect, and thereby serve as brine-diluting seawater inlets. Whether used to expel brine from the conduit or to draw diluting seawater into the conduit, the disclosed openings may extend along a substantial extent (for example, at least 1%, at least 2%, at least 3%, at least 4%, at least 5%, at least 10%, at least 20%, at least 30% or at least 40%) of the brine removal conduit length beyond the first air introduction point. The size, orientation, frequency and positioning of the disclosed openings may if desired vary along the length of the conduit, and may for example represent larger openings at distances close to the first air introduction point and smaller openings at distances further from the desalination apparatus, or vice versa. One or more portions along the length of the brine removal conduit after the first air introduction point may be free of openings, for example to allow for enhanced oxygenation of moving brine within such portion. The furthest (and preferably uppermost) end(s) of the brine removal conduit may be open, partially closed, or closed. Preferably there are sufficient brine outlet openings to disperse the oxygenated brine stream over a larger area (viz., into a larger volume of seawater) than would be obtained using point-source diffusers. In addition, the diffusion flow through the brine outlets preferably is not highly pressurized and thus does not create shear forces that might harm marine life.

The extent to which the brine is diluted, oxygenated or dispersed may he controlled or influenced by a number of factors, including the number, size, shape and axial orientation of the disclosed openings, the pressure and volume of introduced brine airlift air, the respective velocities of the disclosed brine and brine airlift flows, and the presence of turbulence at or after the air introduction point(s).

The disclosed combination of an airlift and a brine delivery conduit with appropriate openings can permit removal, oxygenation, dilution, and dispersal of brine produced by a desalination apparatus over a substantial area remote from the apparatus. This can for example permit dispersal of brine high above a seafloor, without creating an unsafe environmental condition due to brine, which is denser than seawater, pooling on the seafloor. Such pooled brine could harm benthic-dwelling marine life, for example by causing hyper-saline conditions on the ocean floor. Use of an airlift pump to disperse the brine can also save energy compared to the use of marine outfall lines or pressurized brine diffusers commonly employed with shore-based RO plants. In addition, the disclosed airlift brine diffusion system can diffuse brine into a much larger area (viz., volume of nearby water) than is the case for typical marine outfall lines or pressurized brine diffusers. The disclosed oxygenation can also reduce the incidence of naturally-occurring or otherwise induced hypoxia or dead zones in nearby seawater.

In a further preferred embodiment for use with RO desalination, the volume or pressure of airlift air supplied to the disclosed brine removal conduit can be designed, set or adjusted so that during or following startup, the brine airlift air will provide positive control of the volume of saline water flowing through the RO membranes. This can help prevent polarization at the boundary layer near the membrane surface, and will also discourage membrane fouling or scaling. In addition, such control can facilitate adjustment of the salinity of the brine stream, allow modification (e.g., reduction) of the brine stream airlift demand, or allow for sizing or resizing of pretreatment conditions and capacities. In an especially preferred embodiment, the volume or pressure of brine airlift air is designed, set or adjusted to optimize the RO membrane product water recovery rate and membrane health.

Expressed in terms of the air:brine volumetric ratio (determined shortly after the point at which air is injected into the brine removal conduit, and before taking into account the possible entry into the conduit of seawater dilution streams via the disclosed openings), air:brine ratios of at least about 1:99, at least about 5:95, at least about 10:90, at least about 15:85 or at least about 20:80 may be employed. The air:brine ratio may under some conditions be as high as about 99:1, as high as about 95:5, or as high as about 90:10 but under normal operating conditions typically will be less, for example up to about 60:40 or up to about 50:50.

In comparison to conventional marine outfall lines or multiport diffusers, the disclosed brine dispersal system can provide improved brine dispersal with reduced capital and energy requirements. If the disclosed brine airlift system is also used to set or adjust the volume of saline water flowing through the RO membranes, then RO system performance can be controlled at much lower capital cost than would typically be required by the variable frequency drives and seawater pumps typically used to control the pressure and flow rate of seawater through RO membranes in conventional onshore systems.

Suitable compressor equipment for attaining the disclosed airlift is available from a variety of sources that will be familiar to persons having ordinary skill in the art. If desired, compressor units of different types or having different capacities may be combined with one another or with suitable reserve tanks to provide backup, auxiliary or complementary compressed air supplies. For example, a seaborne, submerged or surface platform-mounted compressor unit may he employed in addition to an onshore compressor unit, and any or all of these may if desired be powered in whole or in part by energy derived from waves, wind or sunlight.

As a part of the system design or the startup or operation procedures for any of the disclosed onshore, platform-mounted, seaborne or submerged desalination systems, the brine airlift supply should be set, controlled or adjusted to provide proper brine flow and dispersal, while minimizing high shear conditions near the brine outlets that might harm marine life. This may be done for example by including an orifice plate (located at the surface or more preferably submerged) to limit airflow in the brine airlift line, or by using a valve or regulator (also located at the surface or submerged) for airflow control or adjustment during startup or operation. The air pressures and air volumes required for startup and continuous operation of the brine airlift will depend in part on the depth at which air introduction occurs; the shape, size, and inclination of the brine removal conduit; and the shape, size, number and orientation of the brine outlet openings. Such pressures and volumes may be estimated or empirically determined. As a starting point, the startup and operating pressures desirably are each at least about 14.5 psi (1 bar) above the hydrostatic pressure at the point of air introduction, and may be at least about 29 psi (2 bar), at least about 44 psi (3 bar), at least about 58 psi (4 bar), at least about 73 psi (5 bar) or at least about 145 psi (10 bar) above such hydrostatic pressure. The operating pressure and operating airflow desirably are controlled so as to avoid backflushing the brine removal conduit. For an onshore or submerged desalination apparatus employing RO membranes, the operating pressure desirably avoids backflushing or the creation of high backpressure at the RO membrane outlet. Fortunately however, operation of the disclosed brine airlift can reduce salinity buildup at such RO membranes and can increase the membrane product water flow rate or output.

Attainment of a desired brine airlift operating condition may depend less on controlling the air pressure than on controlling the ratio of air to water. The air fraction (as averaged over the brine removal conduit length from the first air introduction point to the first brine outlet from which brine leaves the conduit) may for example be at least about 1%, at least about 5%, at least about 10%, at least about 30% or at least about 40%, with the latter value typically being characteristic of a slug or churn flow regime. Higher air fractions may be employed, and may be. more likely to provide an annular flow regime over an appreciable portion of the brine removal conduit, for example an air fraction up to about 60%, up to about 70%, up to about 80% and in some embodiments up to about 90%, 95% or even 99%. Mechanical pumping assist may be used if needed to attain sufficient brine flow. In a preferred embodiment however, brine removal is accomplished using only the pressure available at the desalination apparatus brine outlet and the disclosed airlift, and without the need for mechanical pump components between the desalination apparatus brine outlet and the brine removal conduit air introduction point(s).

Exemplary depths for operation of the disclosed brine dispersal system are for example from just below the surface (e.g., from about 10 m), from about 100 m, from about 300 m, or from about 500 m, and up to about 2,000 m, up to about 1,500 m or up to about 1,000 m. Preferred depths are from just below the surface to about 1500 m depth. Operation at depths below the photic zone (depending upon water clarity, corresponding to depths up to about 200 m) is more preferred, as relatively few marine organisms are found below the photic zone. Biofilm growth may also be discouraged by placing the brine outlets at depths having no light, low oxygen, and cold water temperatures.

For SRO systems using the above-mentioned Dow FILMTEC RO membranes and airlift without mechanical pump assist to remove product water and disperse brine, a depth of 680 m or more in preferred in order to provide sufficient hydrostatic pressure for permeation to take place through the membrane at the recommended 800 psi (55 bar) pressure differential across the membrane. The chosen depth and pressure values may however vary in RO systems that take advantage of future membrane developments enabling or requiring lower or higher differential pressures or higher or lower membrane backpressures. Adjustments to accommodate such developments may increase or decrease the preferred operating depth for the disclosed SRO system. For many membranes, the pressure on the low-pressure side typically will not change appreciably with depth, and consequently changing the depth of operation may suffice to adjust the differential pressure across the membrane and achieve optimal operating conditions. In a preferred SRO embodiment, desalination is driven entirely by hydrostatic seawater pressure on the high-pressure side of the RO membranes, a low-pressure condition is maintained on the outlet or product side of the membranes by a flow of compressed air supplied from the surface at a flow rate and pressure sufficient to create an annular flow regime for air and water over a significant portion of the delivery conduit and adequately evacuate the desalinated water product, and brine dispersal is carried out using only airlift from the same surface air supply. Once such a system is at the proper depth and air is flowing at the correct volume and pressure, the system preferably continuously desalinates seawater, delivers pure water to the surface, and disperses brine, with no moving parts below the waterline that would be subject to wear or breakage.

In some prior SRO designs, especially those that rely on a pressure pump to force seawater through the membranes, thick pressure-resistant vessels are employed to contain the high pressures needed for membrane separation. In preferred embodiments of the disclosed SRO desalination system, the prefiltration elements and RO membranes will not require pressure-resistant vessels, as they will already be immersed at a sufficiently high pressure in the fluid to be purified. Desirably the disclosed SRO system merely maintains a sufficiently low pressure on the membrane discharge side, and a sufficient inlet side-outlet side pressure differential, so as to allow proper membrane operation without the use of a surrounding pressure-resistant vessel. The disclosed SRO system consequently can produce significantly lower concentrations of salt in the brine stream than will be the case for conventional RO, as the elimination of the requirement for pressure vessels permits the RO membranes to be arrayed in parallel rather than the typical seawater desalination industry practice of 5-7 membranes in a serial arrangement. A parallel array eliminates a common failure point in conventional RO systems, namely the o-ring interconnections between membranes. A parallel arrangement also permits higher product water production per membrane. In addition, a parallel membrane arrangement creates much less salty brine than a train of single membranes operating in series, and this salinity can be adjusted by adjusting the brine airlift operating parameters. The disclosed SRO system's ability to achieve low brine salinity would be beneficial to sea life and would allow easier brine dilution. For example, using seawater containing 35,000 ppm TDS, the disclosed system may provide brine containing 38,043 ppm TDS (a 9% increase) versus the near-doubling in discharge stream salinity that may arise using conventional serially-configured onshore RO.

These and other advantages of the disclosed brine dispersal system thus may include one or more of:

Reduced power consumption.

Reduced greenhouse gas emissions to diffuse a given quantity of brine.

Reduction or elimination of onshore or offshore high pressure water pumps.

Reduced number of parts requiring expensive alloys and other exotic materials resistant to seawater corrosion.

Reduced localized brine emission.

Parallel rather than series membrane configurations with even lower-salinity brine discharge.

Increased oxygenation of nearby seawater and reduction in hypoxia.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. A wide-area desalination brine dispersal system comprising a brine removal conduit having:
   b) a brine inlet that receives brine from a desalination apparatus;
   c) a plurality of brine outlets submerged in seawater; and
   d) one or more air introduction points located at depths below the brine outlets, for oxygenating and moving brine through the brine removal conduit and outlets via airlift and dispersing the brine into seawater away from the brine removal conduit,
   wherein the brine removal conduit has a first air introduction point, a first brine outlet from which brine leaves the conduit, a first length between such first air introduction point and first brine outlet, and the air lifts brine as averaged over such first length using an air fraction of at least 5% and up to 95%.

2. A system according to claim 1 wherein the desalination apparatus is an onshore apparatus.

3. A system according to claim 1 wherein the desalination apparatus is an offshore platform-mounted or ship-borne apparatus.

4. A system according to claim 1 wherein the desalination apparatus is a distillation or evaporation apparatus.

5. A system according to claim 1 wherein the desalination apparatus is a reverse osmosis apparatus.

6. A system according to claim 5 wherein the desalination apparatus employs reverse osmosis membranes, and when carrying out continuous desalination and continuous brine airlift, operation of the brine airlift reduces salinity buildup at the reverse osmosis membranes and increases the flow rate or output of product water from such membranes.

7. A system according to claim 6 wherein the desalination apparatus is submerged.

8. A system according to claim 7 wherein the membranes are not encased in a surrounding pressure-resistant housing.

9. A system according to claim 7 wherein the desalination apparatus is deployed at a depth that enables hydrostatic pressure to drive seawater through the membranes.

10. A system according to claim 1 wherein the system does not include submerged frictional sliding surfaces, a submerged mechanical pump or a submerged valve.

11. A system according to claim 1 wherein the air lift is provided by an onshore, ship-borne, submerged or surface platform-mounted compressor unit.

12. A system according to claim 1 wherein the air lift is provided by a compressor unit powered at least in part by energy derived from waves, wind or sunlight.

13. A system according to claim 1 wherein the air lifts the brine in a slug or churn flow regime.

14. A system according to claim 1 wherein the air fraction is less than 60%.

15. A system according to claim 1 wherein the brine removal conduit has a first length between such first air introduction point and first brine outlet of at least 1 meter, and a second length between such first brine outlet and the distal end of the brine removal conduit of at least 5 meters.

16. A system according to claim 15 wherein the second length is at least 50 meters.

17. A system according to claim 15 wherein the second length includes openings that allow diluting seawater to be drawn into flowing brine within the brine removal conduit, and the brine outlets extend along at least 30% of the second length.

18. A system according to claim 1 wherein the system provides increased oxygenation of nearby seawater and a consequent reduction in hypoxia or dead zones in nearby seawater.

\* \* \* \* \*